United States Patent
Parakulam et al.

(10) Patent No.: US 8,959,204 B2
(45) Date of Patent: Feb. 17, 2015

(54) FIELD RESPONSE SYSTEM

(75) Inventors: Gopalakrishnan R. Parakulam, Cupertino, CA (US); Satyajit Behari, Aurora, IL (US); Kumar Sathyanarayana Raju, Fremont, CA (US)

(73) Assignee: Imergy Power Systems, Inc., Fremont, CA (US)

( * ) Notice: Subject to any disclaimer, the term of this patent is extended or adjusted under 35 U.S.C. 154(b) by 303 days.

(21) Appl. No.: 13/350,628

(22) Filed: Jan. 13, 2012

(65) Prior Publication Data

US 2012/0185572 A1     Jul. 19, 2012

Related U.S. Application Data

(60) Provisional application No. 61/432,524, filed on Jan. 13, 2011.

(51) Int. Cl.
    *G06F 15/16*     (2006.01)
    *G06F 17/30*     (2006.01)

(52) U.S. Cl.
    CPC .............................. *G06F 17/30283* (2013.01)
    USPC ........................................ 709/224; 709/219

(58) Field of Classification Search
    CPC .................................................... G06F 17/00
    USPC ................................................. 709/219, 224
    See application file for complete search history.

(56) References Cited

U.S. PATENT DOCUMENTS

| | | | |
|---|---|---|---|
| 2006/0041687 A1 | 2/2006 | Caspi et al. | |
| 2006/0080717 A1 | 4/2006 | Barzilay et al. | |
| 2009/0037488 A1* | 2/2009 | Abrams | 707/201 |
| 2010/0318206 A1 | 12/2010 | Ford | |
| 2011/0074357 A1* | 3/2011 | Parakulam et al. | 320/134 |
| 2012/0185187 A1 | 7/2012 | Parakulam et al. | |

FOREIGN PATENT DOCUMENTS

| | | | | |
|---|---|---|---|---|
| WO | WO 2004016025 A2 * | 2/2004 | | H04Q 7/38 |
| WO | WO 2010/138951 A2 | 12/2010 | | |

OTHER PUBLICATIONS

International Preliminary Report on Patentability and the Written Opinion mailed Jul. 25, 2013, in related International Application No. PCT/US2012/021354.

PCT International Search Report and Written Opinion mailed Mar. 28, 2012, in related International Application No. PCT/US2012/021354.

* cited by examiner

*Primary Examiner* — Ebrahim Golabbakhsh
(74) *Attorney, Agent, or Firm* — Haynes and Boone, LLP

(57) ABSTRACT

An apparatus and method for monitoring energy storage devices is disclosed. A monitoring system that monitors an energy storage device collects and stores operating data from the device and relays that data through a communications system to one or more servers. The servers can store the operating data from each of the monitored energy storage devices.

24 Claims, 16 Drawing Sheets

Key To

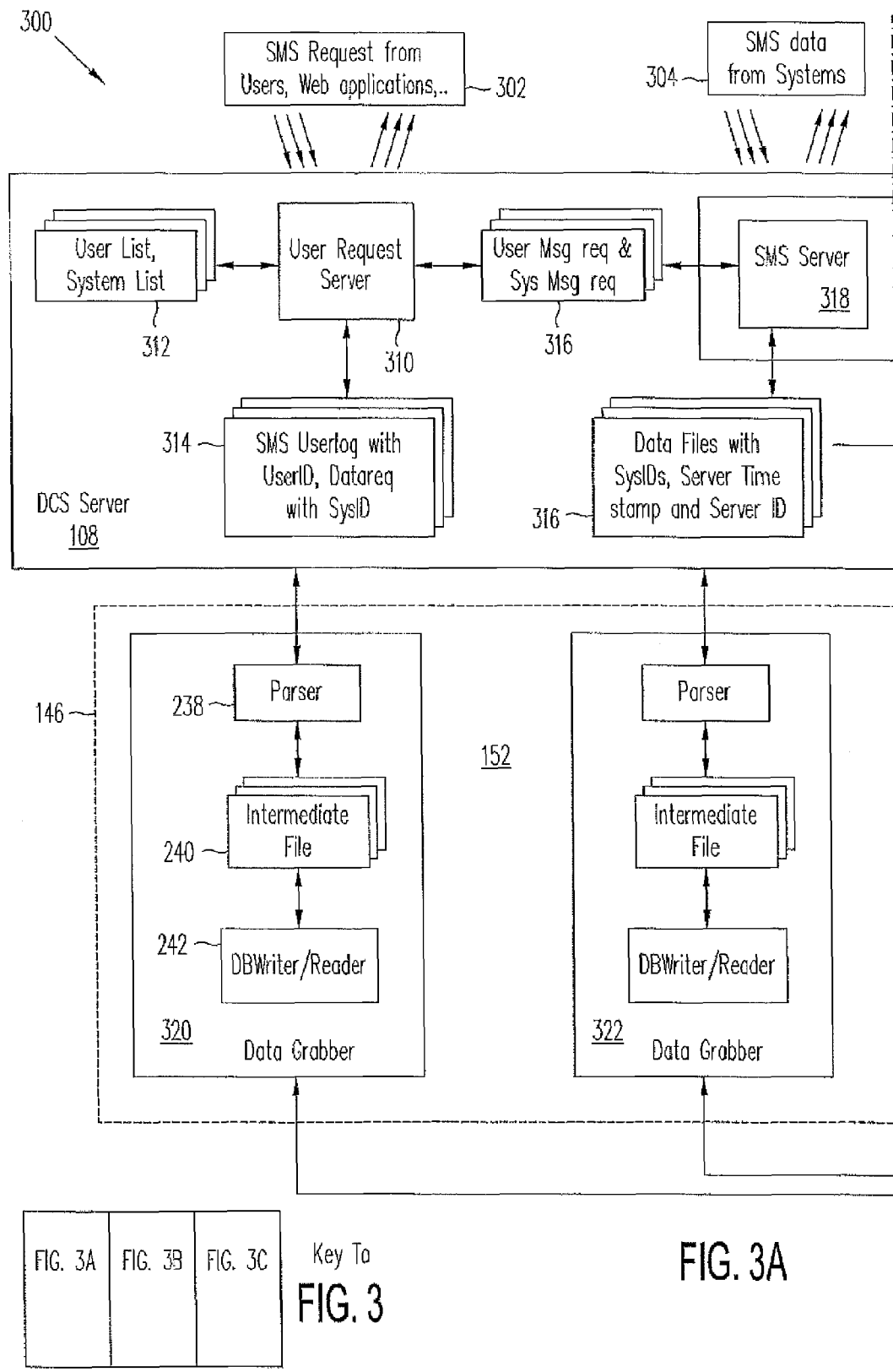

Key To
| FIG. 7A |
| FIG. 7B |

FIELD RESPONSE SYSTEM

REFERENCE TO RELATED APPLICATIONS

The present invention claims priority to U.S. Provisional Application No. 61/432,524, entitled "Field Response System", filed on Jan. 13, 2011, the contents of which are herein incorporated by reference in its entirety.

BACKGROUND

1. Technical Field

Embodiments of the present invention relate to communications systems, and more specifically to a communication system for communication, monitoring, and control of multiple flow cell batteries.

2. Discussion of Related Art

Reduction-oxidation (redox) flow batteries store electrical energy in a chemical form, and subsequently dispense the stored energy in an electrical form via a spontaneous reverse redox reaction. A redox flow battery is an electrochemical storage device in which an electrolyte containing one or more dissolved electro-active species flows through a reactor cell where chemical energy is converted to electrical energy. Conversely, the discharged electrolyte can be flowed through a reactor cell such that electrical energy is converted to chemical energy. Electrolyte is stored externally, for example in tanks, and flowed through a set of cells where the electrochemical reaction takes place. Externally stored electrolytes can be flowed through the battery system by pumping, gravity feed, or by any other method of moving fluid through the system. The reaction in a flow battery is reversible; the electrolyte can be recharged without replacing the electroactive material. The energy capacity of a redox flow battery, therefore, is related to the total electrolyte volume (i.e., the size of the storage tank). The discharge time of a redox flow battery at full power also depends on electrolyte volume and can vary from several minutes to many days.

The minimal unit that performs the electrochemical energy conversion is generally called a "cell," whether in the case of flow batteries, fuel cells, or secondary batteries. A device that integrates many such cells, coupled electrically in series and/or parallel to get higher current, voltage, or both, is generally called a "battery." However, it is common to refer to any collection of coupled cells, including a single cell used on its own, as a battery. As such, a single cell can be referred to interchangeably as a "cell" or a "battery."

Redox flow batteries can be utilized in many technologies that require the storage of electrical energy. For example, redox flow batteries can be utilized to store night-time electricity that is inexpensive to produce, and to subsequently provide electricity during peak demand when electricity is more expensive to produce or demand is beyond the capability of current production. Such batteries can also be utilized for storage of green energy (i.e., energy generated from renewable sources such as wind, solar, wave, or other non-conventional sources). Flow redox batteries can be utilized as uninterruptible power supplies in place of more expensive backup generators. Efficient methods of power storage can be used to construct devices having a built-in backup that mitigates the effects of power cuts or sudden power failures. Power storage devices can also reduce the impact of a failure in a generating station.

Therefore, there is a need for better flow-cell batteries and for better monitoring of flow cell batteries.

SUMMARY

Embodiments of the present invention provide a method and apparatus for field monitoring a collection of flow cell battery systems. A field response system according to the present invention includes a first data grabber receiving data files from a first communications system server, the first communication system receiving data from a plurality of flow cell systems; a first synchronizer receiving data files from a second communications system server and is coupled to the first data grabber, the second communications server receiving data the plurality of flow cell system; and a first database, the database storing data from the first data grabber, including data from the first synchronizer and the first communications server.

A method of monitoring a plurality of flow cell systems includes receiving data files from a first communications system server into a first data grabber, the first communications system server receiving data from a plurality of flow cell systems; receiving data files from a second communications system server into a first synchronizer that is coupled to the first data grabber, the second communications server receiving data from the plurality of flow cell systems; and storing data received from the first data grabber, including data from the first synchronizer and the first communications system, into a first database.

These and other embodiments of the invention are further described below with respect to the following figures.

The figures are illustrative only and relative sizes and distances depicted in the figures are for convenience of illustration only and have no further meaning.

DETAILED DESCRIPTION

In the following description, for the purposes of explanation, specific details are set forth in order to provide a thorough understanding of some embodiments of the invention. However, it will be apparent that the invention may be practiced without these specific details.

Complex systems, for example reduction-oxidation (redox) battery systems, integrate complex electrical, mechanical, and chemical components. To operate such a complex system efficiently and reliably, collecting and analyzing information throughout the life of the system and its constituent parts, from manufacturing to operation in the field, can be beneficial. Before a system is assembled, important information about components can be collected and stored during testing. Once subsystems are assembled from components and systems assembled from components, important information recorded during testing can also be collected. Once a complete system is operating in the field, operational data can be collected.

Figure 1A:
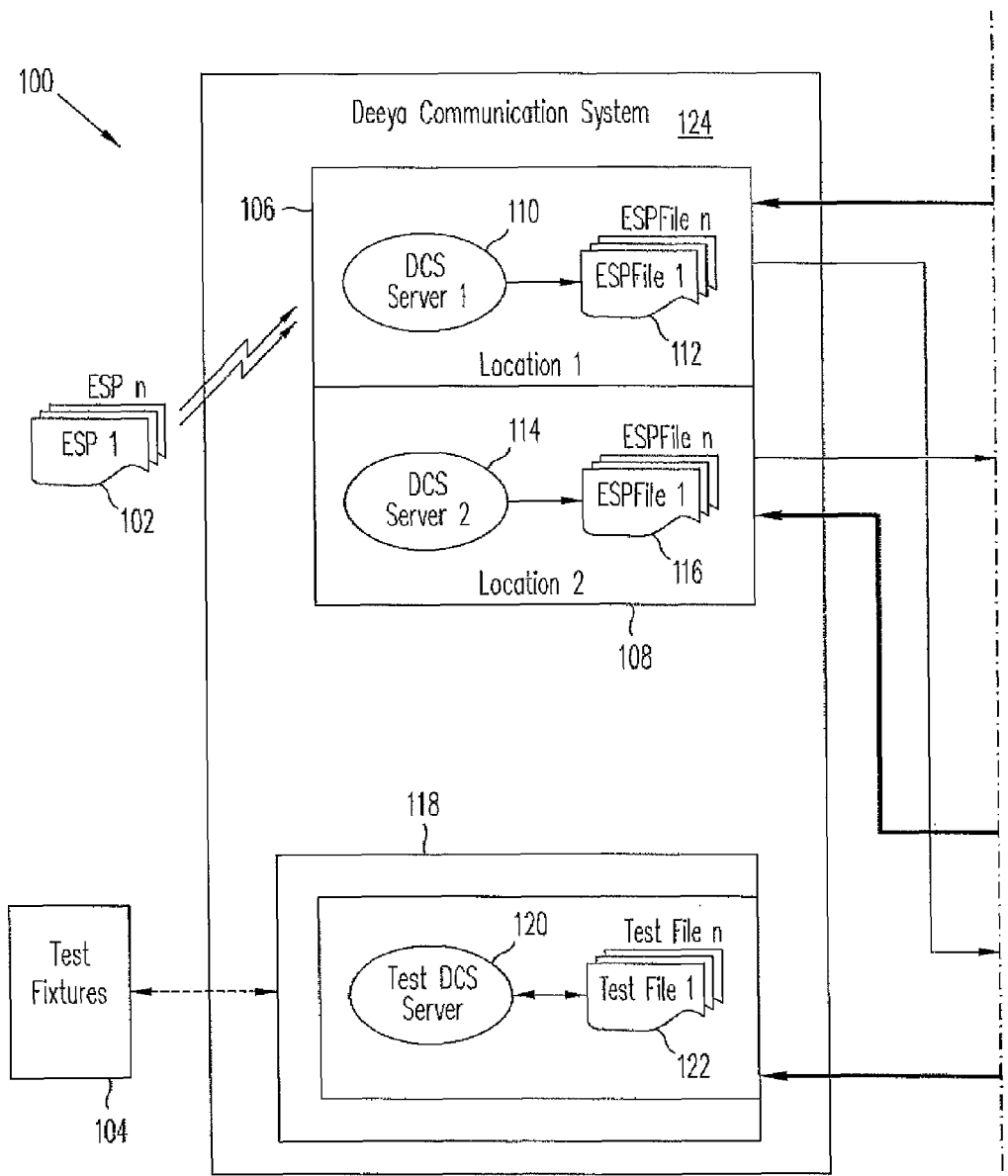
FIG. 1 illustrates a field response system according to some embodiments of the present invention.
Figure 1:
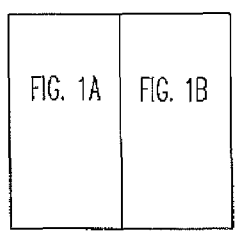
Figure 1B:
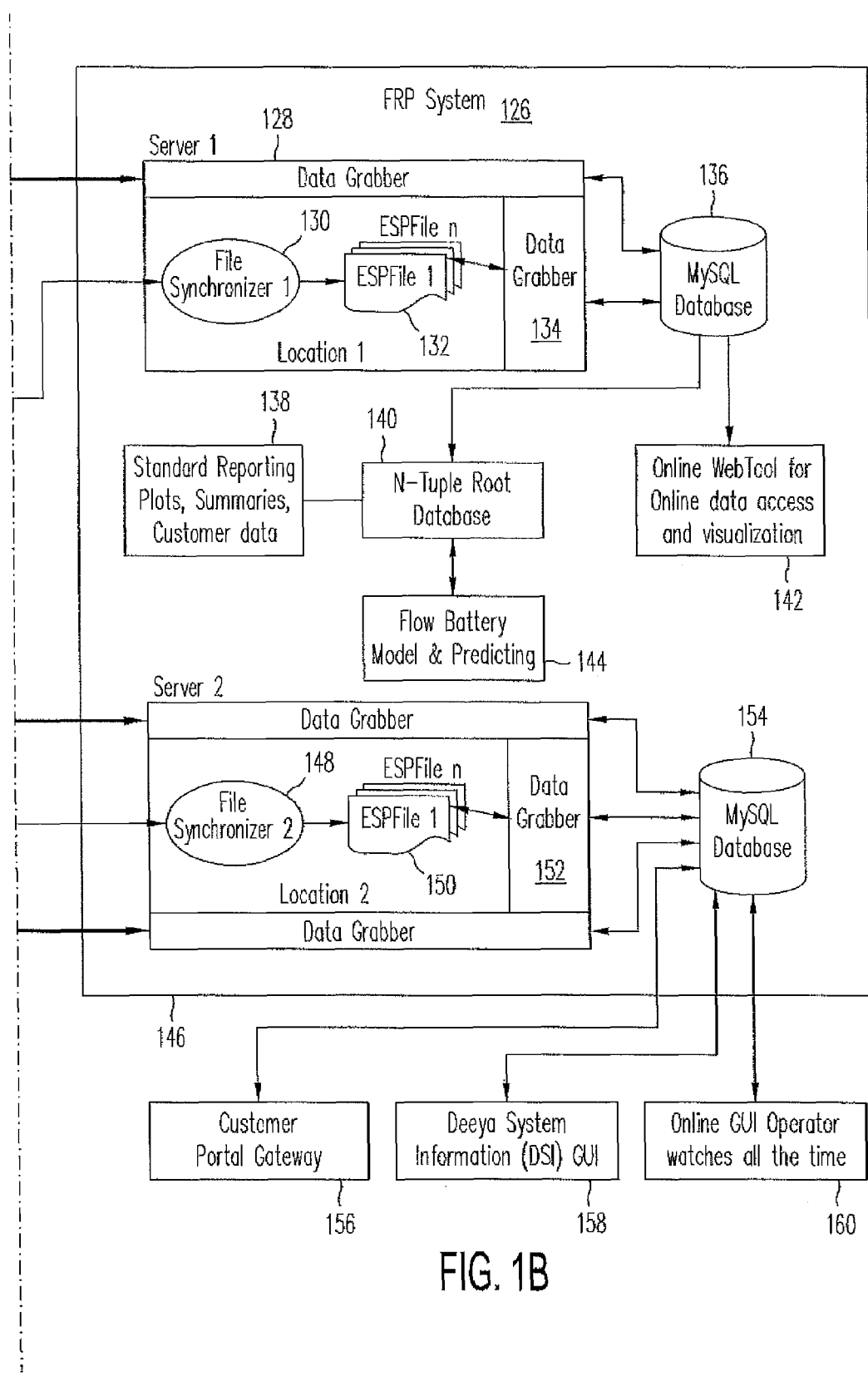

There are many reasons for monitoring the operation of a flow cell battery. Those reasons include system performance, system tuning, system reliability, system maintainability, system trackability, and system safety. FIG. 1 illustrates a Field Response System (FRP) 126 that is coupled to a Communication System, the Deeya Communication System (DCS) 124, according to some embodiments of the present invention.

As shown in FIG. 1, DCS system 124 includes individual systems 106 and 108 at location 1 and location 2, respectively. In general, location 1 may be geographically separated from location 2 or location 1 and location 2 can be co-located at the same geographic location. Further, there may be any number of individual systems located at any number of geographic locations.

As shown in FIG. 1, a group of n individual flow cell batteries (ESP) 102 communications with one or both of individual systems 106 and 108. Further, a test fixtures 104 can communicate with a test system 118. In some embodiments, each of the n individual ESPs 102 transmits data to DCS system 124 periodically (e.g., every minute). Data sent between DCS system 124 and individual ones of ESPs 102 can include, for example, state change information (e.g., from charge to discharge, discharge to charge, etc.), system information (e.g., system identifier, component info, etc.), system operation information (e.g., efficiency, ESR, etc.), DCS information (e.g., phone numbers, IP addresses, port numbers, user identification, passwords, etc.), Ebox information (e.g., serial numbers, firmware revision, etc.), and system parameters (e.g., Electrostatic Resistance (ESR), State of Charge (SoC) High limit, etc.).

As show in FIG. 1, system 106 includes a DCS server 110. DCS server 110 receives data from flow systems ESP 102 and provides ESPfiles 112 of raw data. Similarly, system 108 includes a DCS server 114 that receives data from flow systems ESP 102 and creates ESPfiles 116 of raw data. Similarly, system 118 includes a server 120 that receives data from test fixtures 104 and creates test files 122 of raw data. The DCS is further described in U.S. application Ser. No. 13/084,381, filed in the United States on Apr. 11, 2011, which is herein incorporated by reference in its entirety.

FRP system 126 is coupled to receive data from DCS 124. In particular, FRP system 126 receives data from system 106 at location 1 and from system 108 from location 2. As shown in FIG. 1, FRP system 126 includes FRP server 128 and FRP server 146. FRP server 128 may be geographically located with GPS server 106 at location 1 and FRP server 146 may be geographically located with GPS server 108 at location 2. However, FRP servers 128 and 146 may be at any location and may be housed at the same geographic location. Communications between FRP system 126 and DCS system 124 may be accomplished in any fashion and may utilize any communications medium.

As shown in FIG. 1, FRP server 128 includes a file synchronizer 130 and data grabber 134. Datagrabber 134 receives raw data file 112. Data grabber 134 facilitates transfer of raw data file 112 from DCS system 106 into a database 136, which can be a MySQL Database. File synchronizer 130 retrieves raw data file 116 to create a synchronized data file 132. Data grabber 134 facilitates transfer of data into server 128 from DCS system 106 into a database 136, which can be a MySQL Database. File synchronizer 130 facilitates transfer of data into server 128 from DCS system 108 for transmission to database 136. In some embodiments, datagrabber 134 retrieves data from DCS system 124 periodically, for example every two minutes. In some embodiments, file synchronizer 130 can operate periodically, for example every five minutes.

Similarly, FRP server 146 includes a file synchronizer 148 and data grabber 152. Data grabber 152 receives raw data 116 from system 108. Data grabber 152 then transfers ESP data file 116 to a database 154, which may be a MySQL database. File synchronizer 148 receives raw data 112 and creates synchronized ESP data file 150 from raw data 112 and raw data 116. Data grabber 134 then transfers synchronized ESP data file 150 to a database 154, which may be a MySQL database.

As discussed above, FRP server 128, which includes datagrabber 134 and synchronizer 148, operates substantially the same as does FRP server 146, which includes datagrabber 128 and synchronizer 130. In some embodiments, an FRP system 126 may include a single FRP server, for example FRP server 128. However, in most embodiments FRP system 126 includes both FRP server 128 and FRP server 146 and communicates with two DCS servers such as DCS server 106 and DCS server 108.

With synchronizing and data recover, databases 136 and 154 includes the same data. In some embodiments, FRP system 126 can include any number of individual servers like servers 128 and 146. Two servers, as is shown in FIG. 1, provides redundancy that is lacking if a single server is utilized, although some embodiments of the FRP system 126 may utilize a single server and single database configuration. More than two servers can be included if there are multiple DCS servers as well and synchronization between all of the DCS servers and all of the FRP servers can take place.

As is further shown in FIG. 1, FRP system 126 may include data evaluation and analysis tools that operate on the data stored in database 136 or database 154. Although other tools may be included, FRP system 126 as shown in FIG. 1 includes a reporting tool 138 that can produce standard plots, summaries and customer data. Reporting tool 138 can be coupled with a N-Tuple root database 140 and flow battery modeling tool 144 to provide for the analysis. An online webtool for online data access and visualization tool 142 can also be included. Further, outside access to the data stored in databases 136 and 154 can be provided by customer portal gateway 156, system information GUI 158, or online operator GUI 160. Online GUI 160 can provide for real-time operator monitoring of flow system ESPs 102.

Tools 138, 140, 142, and 144 can be physically located with either one of databases 136 and 154, and may be included with both databases 136 and 154. DCS server 128 and database 136 can be located at location 1 with DCS server 106. DCS server 146 with database 154 can be located at location 2 with DCS server 108. Alternatively, FRP servers 128 and 146 can be co-located with either of DCS servers 106 or 108 or at a third location.

Databases 136 and 154 can by any databases, for example they can be MySQL databases. The MySQL database structure has several advantages that can be exploited by FRP system 126. For example, MySQL is an inexpensive industry standard Relational DB Management system. Further, MySQL is well supported on the Ubuntu platform and the Linux O/S variant of our choice. Further, the MySQL Views let the engine perform various tasks, e.g. sorting and other column based calculations on the fly as data streams into the database. Additionally, the storage and retrieval procedures of MySQL let user retrieve selective data easily and conveniently.

For ease of description, FIG. 1 depicts DCS system 124 having two DCS servers, servers 106 and 108, while FRP system 126 includes two FRP servers, servers 128 and 146. However, in general, DCS system 124 can include any number of DCS servers that communicate with any number of ESPs 102. Correspondingly, FRP system 126 includes a FRP server for each DCS server in DCS system 124. Further, each of the FRP servers includes a data grabber for communication with the corresponding DCS server and a number of file synchronizers to communicate with the remaining DCS servers. As is discussed with respect to FIG. 4 below, modularity can be achieved with the configuration illustrated in FIG. 1.

Figure 2A:
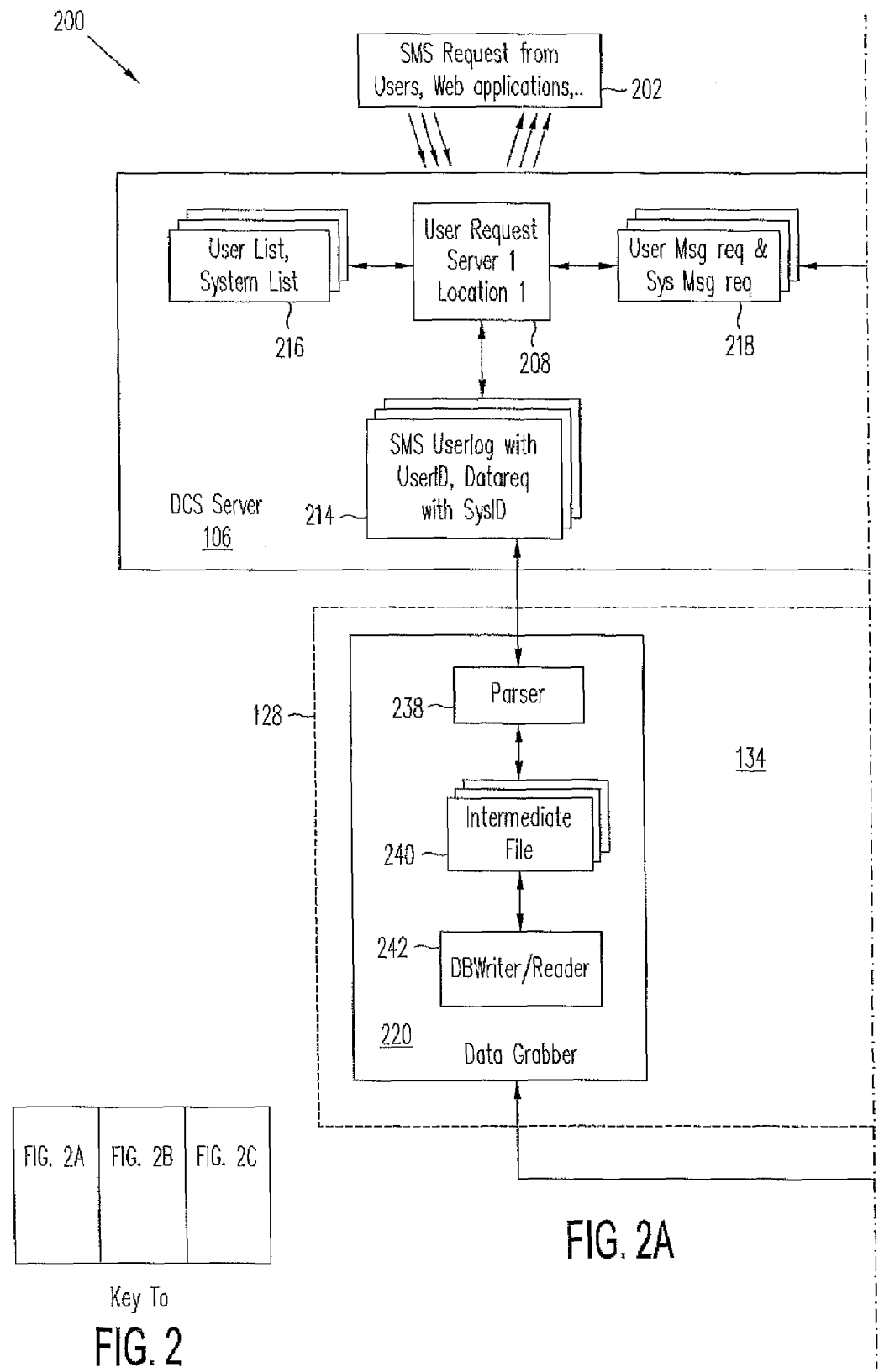
FIG. 2 illustrates a portion of the field response system as illustrated in FIG. 1.
Figure 2B:
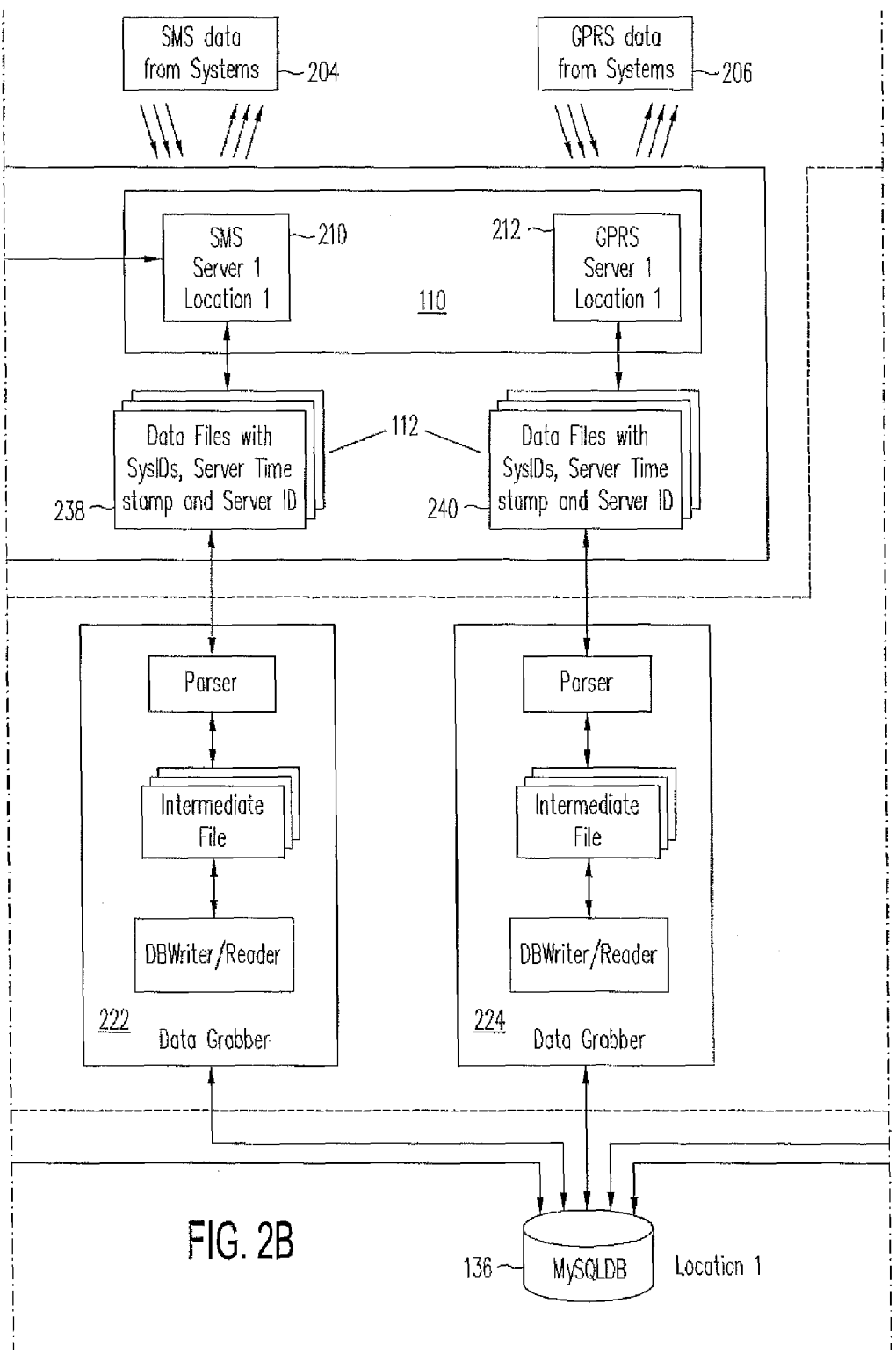
Figure 2C:
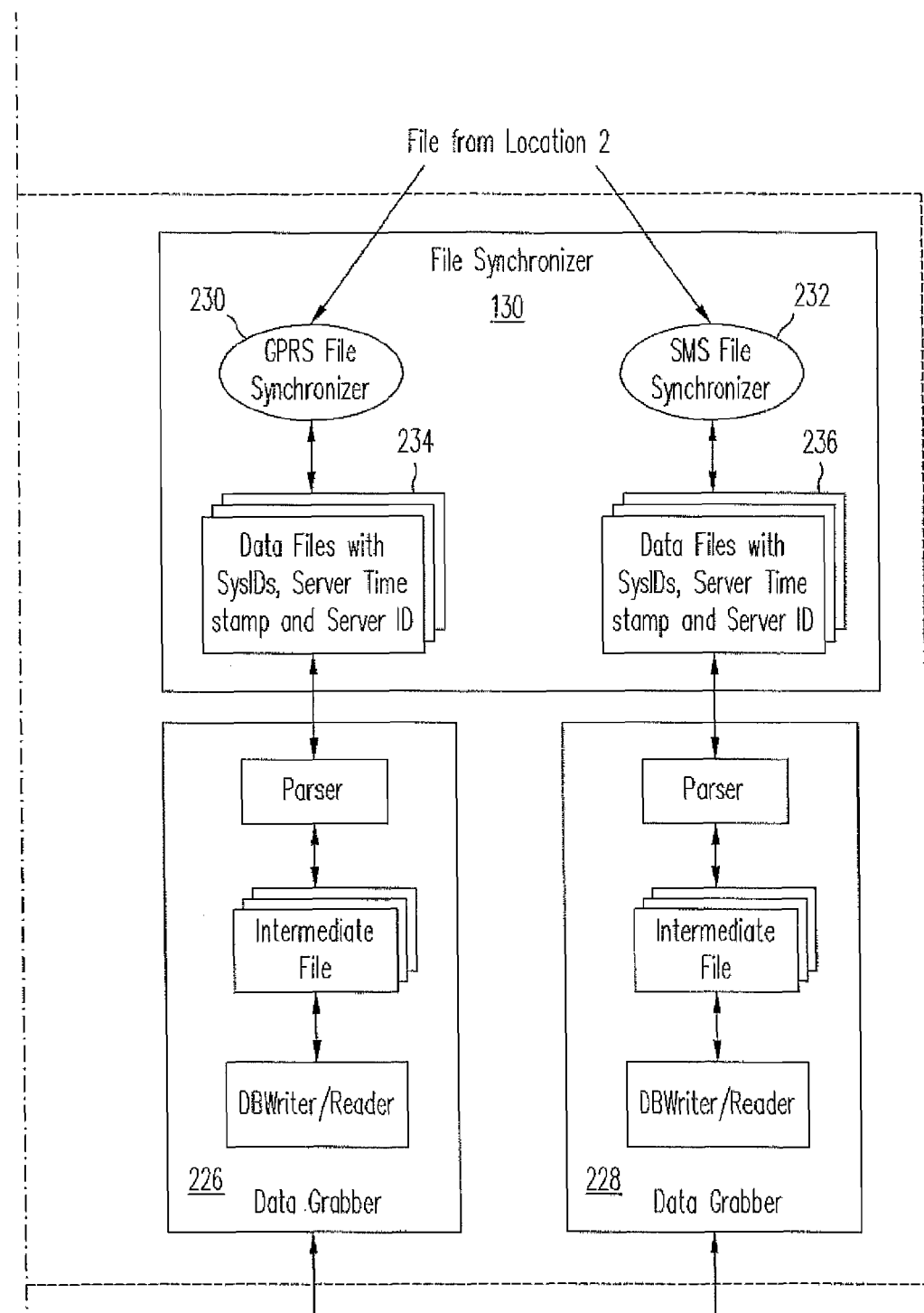

FIG. 2 further illustrates a portion of system 100, system 200, that is an example of FRP 128 interacting with DCS system 124 according to some embodiments of the present invention. As shown, server 110 of DCS system 106 includes an SMS server 210 and a GPRS server 212, both of create ESP data files 112. As shown in FIG. 1, ESPs 102 communicate to SMS server 210 through an SMS data network 204 and to server 212 through a GPRS network 206. ESP data files 238 created by server 210 include SMS data files while ESP data files 240 created by server 212 include GPRS data files. ESP data files 112, which includes ESP data files 238 and ESP data files 240, include data parameters from individual ESPs 102, for example including system IDs, server time stamps, server IDs, and flow cell system specific parameters as discussed above.

In addition to server 110, DCS system 106 can include a user request server 208 that receives user request, for example, from data network 202. User server 208 can create a data file 214 that includes a userlog with userID, data requests, and system IDs. User server 208 can keep a data file 216 that includes a user list and a system list. User server 208 can communicate with server 110 through a request file 218. In some embodiments, user request server 208 may receive requests through user Web applications or SMS requests through data network 202.

As shown in FIG. 2, file synchronizer 130 includes a GPRS synchronizer 230 and a SMS file synchronizer 232. GPRS file synchronizer 230 receives GPRS data files 234 from DCS system 108. SMS file synchronizer 232 receives SMS data files 236 from DCS system 108. GPRS data files 234 and SMS data files 236 include system IDs, server time stamps, server IDs, and flow cell system specific parameters that are received by DCS system 108. Although GPRS and SMS protocols are discussed here, other standards (e.g., UMTS, HSPA, EVDO, WiMax, etc.) can be utilized to communicate with the ESPs 102.

Data grabber 134 includes multiple individual data grabbers, with data grabber 220 coupled to receive data files 214 from DCS server 106, data grabber 222 coupled to receive SMS data files 238 from DCS server 106, data grabber 224 coupled to receive GPRS data files 240 from DCS server 106, data grabber 226 coupled to receive GPRS data files 234 from synchronizer 130, and data grabber 228 is coupled to receive SMS data files 236 from synchronizer 130. As shown in FIG. 2, data grabbers 220, 222, 224, 226, and 228 are coupled to receive and provide data to database 136.

As shown in FIG. 2, each of data grabbers 220, 222, 224, 226, and 228 receive a data file into a parser 238 and creates intermediate data files 240. Intermediate data files 240 are then provided to a database reader/writer 242 for transfer to database 136. Additionally, data grabber 134, which includes grabbers 220, 222, 224, 226, and 228, for example in order to respond to a user request from user server 208, can read data files from database 136.

Figure 9:
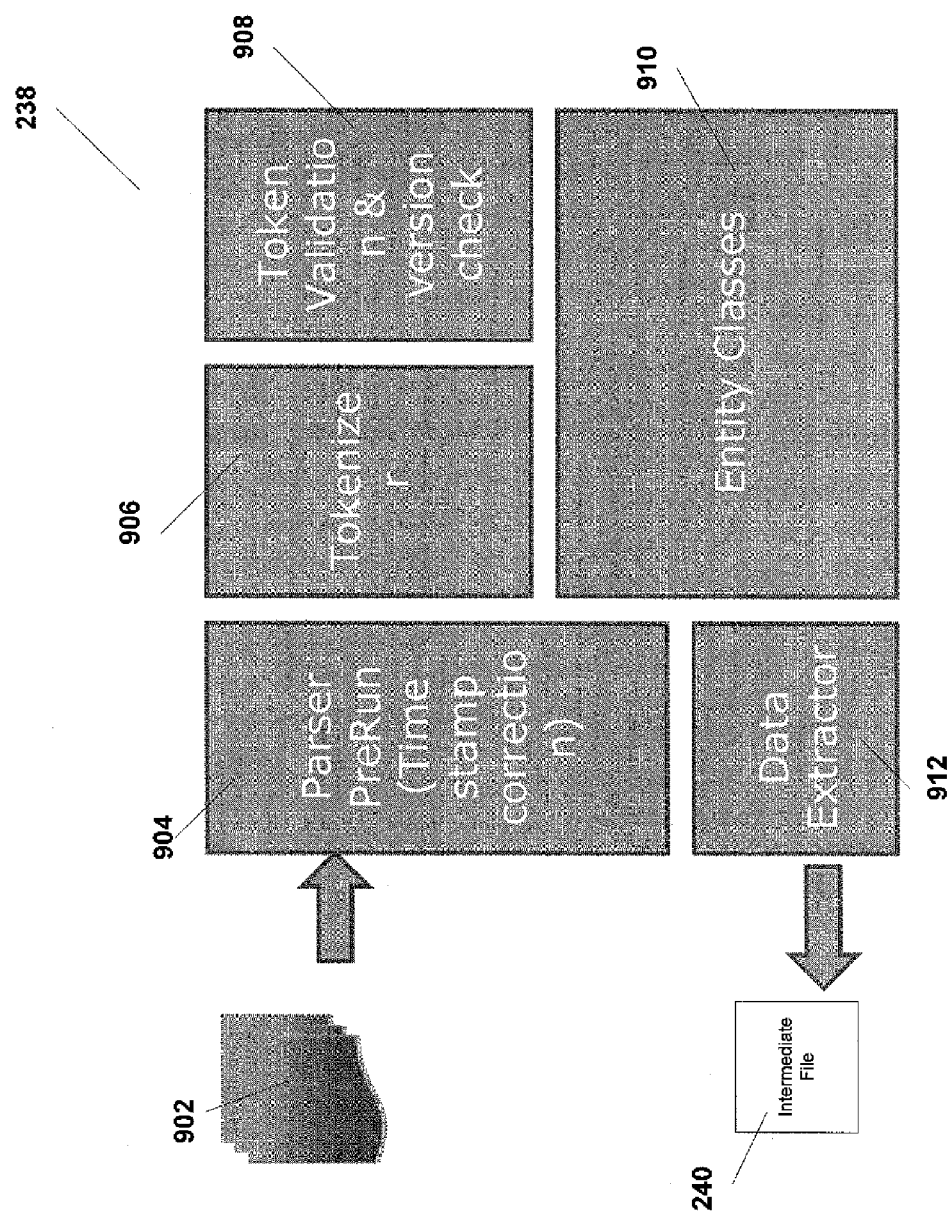
FIG. 9 illustrates a parser in a datagrabber illustrated in FIGS. 1-3 according to some embodiments of the present invention.

Parser 238 can be an object oriented DCS data parser. A block diagram of an example data parser is shown in FIG. 9. As shown in FIG. 9, data is input to data parser 238 from data files 902. From FIG. 2, data files 902 represents data file 214 for data grabber 220, data file 238 for data grabber 222, data file 240 for data grabber 224, data file 234 for data grabber 226, and data file 236 for data grabber 228. The data received by parser 238, and any of the servers, is prone to formatting problems at the data source or during the GPRS/SMS transmission. GPRS and SMS data streams come in different formats. Registration and Error information also have their own formats. An Object Oriented parser suppresses ill formatted data and reformats them to FRP intermediate format before outputting to intermediate file 240. This ensures high reliability of the downstream processing chain.

As shown in FIG. 9, parser 238 includes a prerun module 904 that provides corrections for the time stamp, a tokenizer 906, a token validation and version check module 908, an entity class data base 910, and a data extractor 912. Data written into intermediate file 240, then, is provided with corrected data in a format that is standardized for FRP system 126.

Data grabber 134 can process data before it is stored in database 136. Data grabber 134 can perform time synchronization for one or more of servers, list synchronization with servers through central database, and accumulate data from servers for storage in database 134. List synchronization can be when system list (e.g., list of registered systems with phone numbers), authorized user list (e.g., list of authorized users and respective privileges), SMS command list (e.g., list of SMS commands and respective access control information), and the like are synchronized with lists in database 136. In some embodiments, Data grabber 134 can run periodically, for example every 2 minutes. Data grabber 134 looks for new data that has arrived from DCS system 106 and, through synchronizer 130, from DCS system 108. If any new data has arrived then the incremental data is taken and parsing performed on that data. The parsed data is then written into database 136. Data grabber 134 can also read the data from database 136 and can send it out to DCS system 106 if there is a request from DCS system 106.

As shown in FIGS. 1 and 2, data grabber 134 communicates with servers 110 and server 208 to propagate changes to the list of ESP 200 systems, parse data before it is stored in database, and synchronize messages from the servers. As one with ordinary skill in the art can appreciate, servers 208, 110, and database 136 each can reside on the same physical server, on individual physical servers, or in various combinations of physical servers.

As such, each of data grabbers 220, 222, 224, 226, and 228 has two major components: parser 238 and database Writer/Reader 242. Parser 238 in one direction takes the data from the corresponding one of DCS server files 214, 238, 240 or synchronization files 234 and 236, respectively, and parses the information. If a new information has arrived since the last read. The parsed information is then written to an intermediate file 242. The database Writer/Reader 220 then runs when a new information is available in the intermediate file 242. The new information is taken and written to database 136.

Figure 3B:
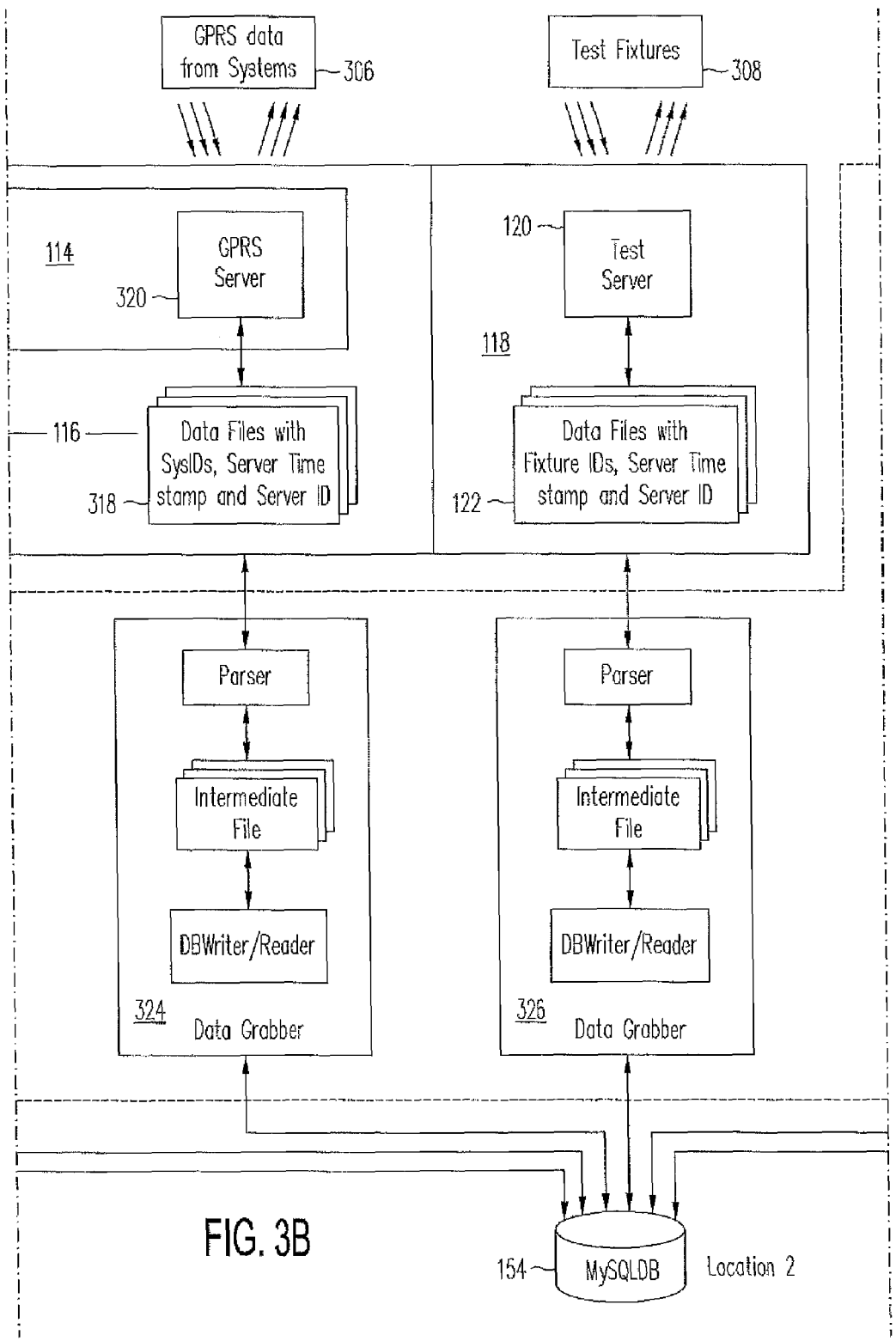
FIG. 3 illustrates another portion of the field response system as illustrated in FIG. 1.
Figure 3C:
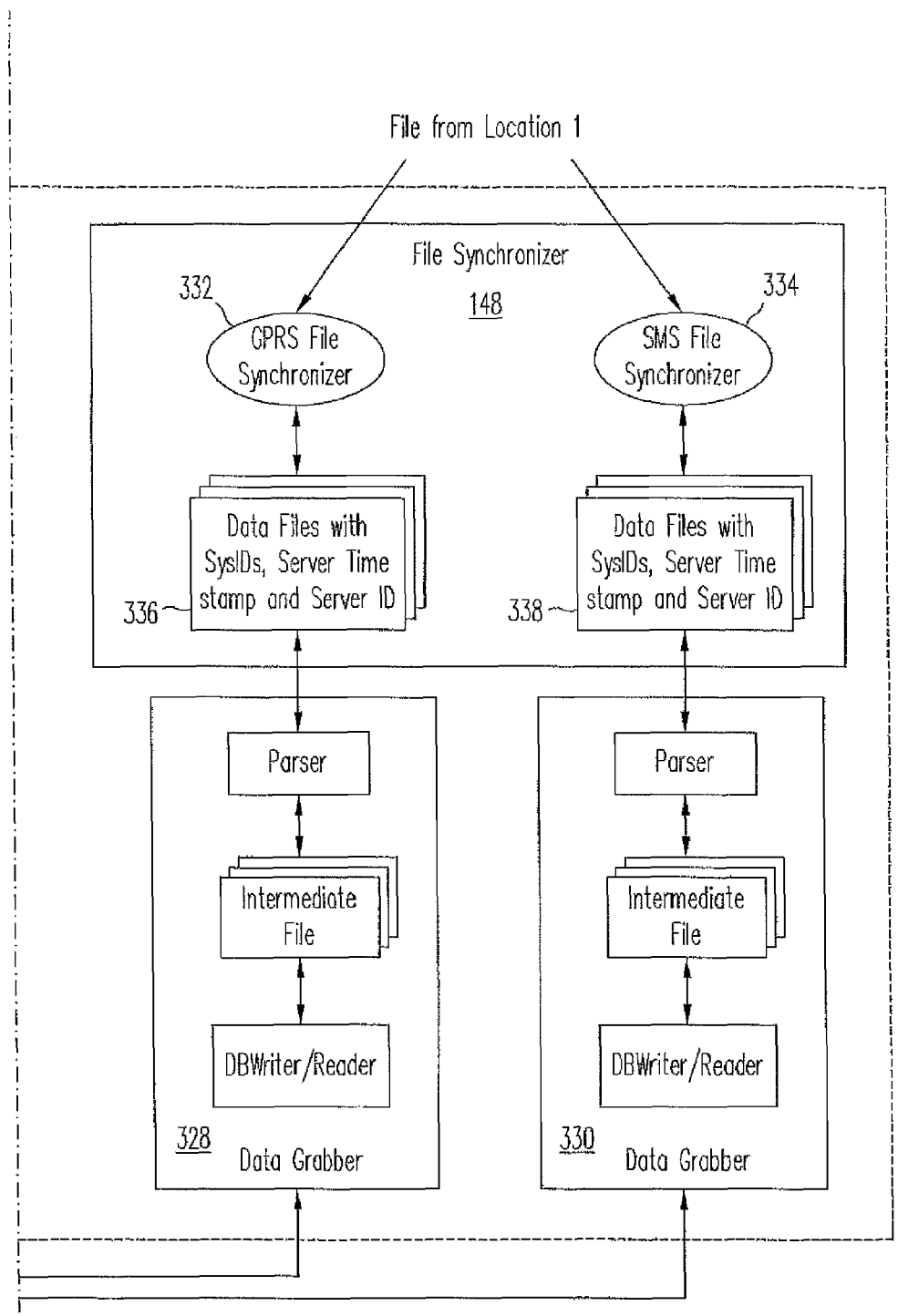

As is shown in FIG. 2, DCS system 106 and FRP system 128 can be geographically located at location 1. Additionally, database 136 can be geographically located at location 1. As shown in FIG. 3, DCS system 108, DCS system 118, and FRS system 146 can be collocated at location 2.

FIG. 3 shows system 300, which is a portion of system 100 that includes DCS system 114 and FRS server 146. As shown in FIG. 3, DCS system 108 is coupled to FRP server 146. DCS 108 includes server 114, which includes an SMS server 318 and a GPRS server 320. SMS server 318 communicates through a SMS data network 304 with ESPs 102. SMS server 320 communicates through a GPRS data network 306 to ESPs 102. As shown, SMS server 318 provides SMS ESP data files 316 and GPRS server 320 provides GPRS ESP data files 318. ESP data files 116 includes SMS EST data files 316 and GPRS ESP data files 318. Further, a user server 310 can be coupled to users through a data network 302.

User server 310 provides for user data files 314. User server 310 utilizes user files 312 and communications with server 114 through user files 316. As shown in FIG. 3, user server 310 receives user requests from user SMS requests or web applications through user network 302.

Further, test server 118 is shown in FIG. 3. System 118 communicates with test fixtures 104 through a network 308 and test server 120. The Test fixtures, which test various electronic boards and mechanical assemblies, communicate to the test server 120 through network 308, which may be a wireless network or a wired Ethernet or other means. Data from the text fixtures is stored in data files 122.

As is further shown in FIG. 3, FRP 146 includes synchronizer 148. Synchronizer 148 includes a GPRS synchronizer 332 that receives GPRS data from DCS system 106 at location 1 and creates GPRS data files 336. Synchronizer 148 also includes SMS synchronizer 334 that receives SMS data from DCS system 106 at location 1 and creates SMS data files 338.

As is further shown in FIG. 3, data grabber 152 includes individual data grabbers, including data grabber 320 coupled to user data files 314, data grabber 322 coupled to SMS data files 316, data grabber 324 coupled to GPRS data files 318, data grabber 326 coupled to test data files 122, data grabber 328 coupled to GPRS synchronization data files 336, and data grabber 330 coupled to SMS synchronization data files 338. As is shown in FIG. 3, and discussed above, each of data grabbers 320, 322, 324, 326, 328, and 330 includes parser 238, intermediate file 240, and database reader/writer 242. Further, data grabbers 320, 322, 324, 326, 328, and 338 write and read data from database 154.

As is appreciated, FRP system 128 and FRP system 146 are similar and operate in the same fashion. FRP system 128 can operate on the same server system as does DCS system 106 and FRP system 146 can operate on the same server system as does DCS system 108.

Figure 4:
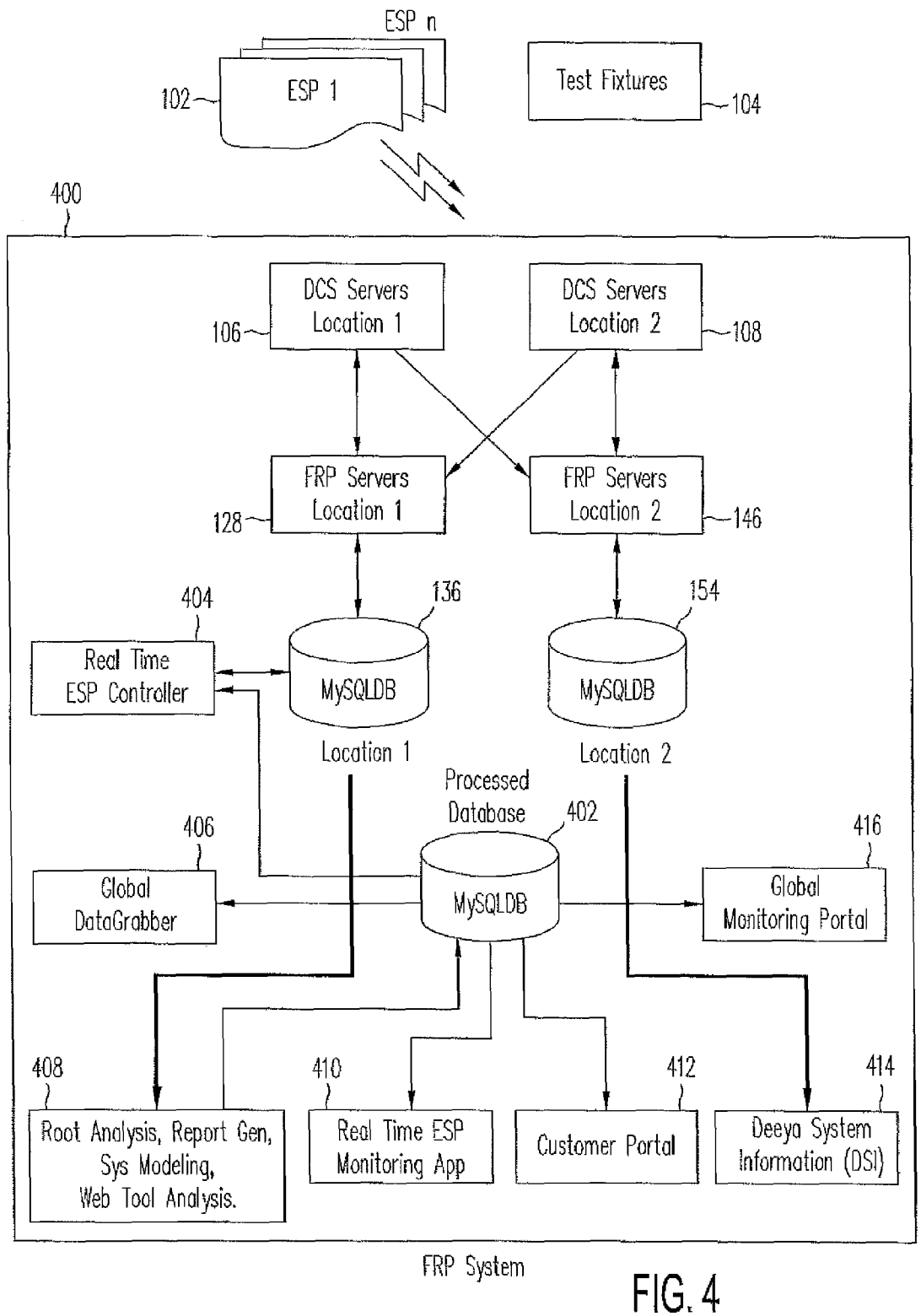
FIG. 4 illustrates modularity of a field response system according to some embodiments of the present invention.

FIG. 4 illustrate system 100 in modular form, modular system 400. Modular system 400 is another depiction of FRP system 126. As shown in FIG. 4, one or more flow cell systems ESP 102 and text FIG. 104 communicate with system 400. Modular system 400 includes DCS servers 106 and 108. FRP server 128 is coupled to receive data from DCS server 106 and to synchronize data with DCS server 108. FRP server 128 writes the data into database 136. Similarly, FRP server 146 is coupled to receive data from DCS server 108 and to synchronize data with DCS server 106. FRP server 146 writes the data into database 154. Analysis tool 408 receives the data from databases 136 and 154 and provides processed data into a processed database 402. Tool 408 can also provide root analysis, system modeling, report generation, and perform other tasks. Processed database 402 can be any database, including a MySQL database.

Tool 410 can provide real time error and system performance (ESP) monitoring. Further, tool 404, which is coupled to database 402 and one of databases 136 and 154, can provide form error control. A customer portal 412 can be provided to allow customers to monitor and control individual ESPs 102 that they own. A system information tool 414 can also be provided to allow for system wide analysis and monitoring. Modular system 400 can be coupled to other modular systems 400 through a global data grabber 406 and a global monitoring portal 416, which will be discussed in further detail below.

System performance can be determined from data collected and analyzed from a complete system operating in the field. Such performance information can be useful for demonstrating value (e.g., cost savings) to current and potential buyers. RTE (Round trip efficiency), CDR(Charge to Discharge Ratio) value, and other matters can demonstrate performance. Data maintained in databases 136 and 154 can be monitored and analyzed and actions taken on individual flow systems (ESPs 102) either directly through the DCS system 124 or during a subsequent maintenance procedure, based on the analysis. Consequently, several goals can be achieved through FRP system 126. Some of those goals can include one or more of system tunability, system trackability, system maintainability, system safety; and system reliability.

Real time controller 404, analysis module 408, real time monitoring 410, customer portal 412, and system information 414 can be individual software programs executed on the servers of FRP system 400. In general, FRP system 400 includes multiple servers, each of which includes one or more processors and various forms of memory. Memory may include data storage facilities such as disk drives or other media and volatile and non-volatile memory. Analysis modules can be executed in software on any of the processors in FRP system 400.

With regard to system tunability, changes in metrics can be used to identify and remedy sub-optimal operation and predict failures. For example, if a redox flow cell battery (one of ESPs 102) goes out of balance, an electrolyzer can be activated to restore balance.

With regard to system trackability, once a component or subsystem is identified as the source of suboptimal operation or even failure, its complete history back to manufacturing can be analyzed based on the data captured in databases 136 and 154. Reports based on past performance of the individual flow cell system can then be generated.

With regard to system maintainability, components in other flow cell systems manufactured and/or operated at the same time, same revision, under the same conditions, using the same methods, or other standard as a failing component identified through analysis of the data in databases 136 and 154 can be identified and proactively remedied. Such maintenance can be performed, for example, during the next regularly scheduled maintenance visit instead of being performed in a costly unscheduled emergency service visit.

With regard to system safety, certain systems in each of the flow systems ESPs 102 can be monitored and safety tested. For example, if the system Rebalance Cell (RBC) operating current goes very high then the RBC can be shutdown or the operating window of the ESP be reduced. In this way we can prevent the thermal runaway of the RBC.

With regard to system reliability, individual components of each one of the flow systems in ESPs 102 can be monitored. The flow battery has pumps to deliver the electrolyte to the reactor cell, which can be monitored to detect early failure. Further, the Electrolyte can leak causing damage to the system and a system shutdown. Additionally, the flow cell system might deteriorate over a period of time, a process that can be monitored and mitigated.

The overall performance of the System can be monitored to assess the health of the system. Electronic subsystems can be monitored to determine, predict, and prevent failures of the system. The system performance can be monitored and fine tuned by sending commands over DCS system 124 to achieve better efficiency and better safety.

As discussed above, FIGS. 1-3 illustrate an example of Field Response System (FRS) 126 for capturing and storing information throughout the life of one or more of flow systems ESPs 102. Information can be received from and sent to numerous sources, including ESPs 102, users through user networks 202 and 302, and test fixtures 104. Data can be received from or sent to one or more GPRS servers, SMS servers, and/or user request servers. As shown, GPRS servers 212 and 320 communicate through GPRS networks 206 and 306, respectively, with individual ones of ESPs 102. Similarly, SMS servers 210 and 318 communicate through SMS networks 204 and 304, respectively, with individual ones of ESPs 102. Further, user servers 208 and 310 can communicate through SMS user servers 202 and 302, respectively, with users to provide data from databases 136 and 154 to users. Synchronization 130 and Synchronization 148 then insure that databases 136 and 154 are synchronized with each other.

GPRS servers 212 and 320 can send and receive GPRS data that has been received through networks 206 and 306, respectively. Communications networks 206 and 306, which can include an Ethernet network, is ultimately coupled to the central databases 136 and 154. GPRS servers 212 and 320 can service multiple active GPRS connections simultaneously, for example, using a multi-threaded architecture. GPRS servers 212 and 320 can also have one or more levels of buffering, for example, to buffer simultaneous incoming connection requests.

GPRS server data files 240 and 318 can be marked with an identifier of the GPRS system on which the GPRS server data file is stored. In some embodiments of the present invention, GPRS servers 212 and 320 store data in time slotted sections for each of the individual flow systems in ESPs 102 and can transmit GPRS server data file 240 or 318 every time section to data grabber 224 and data grabber 324, respectively.

SMS servers 210 and 318 can send and receive SMS data through a communications network (e.g., global system for mobile communications (GSM)) 204 and 304, respectively. As shown in FIGS. 2 and 3, user request servers 208 and 310 can send and receive requests from users through SMS communications networks 202 and 302, respectively. Test servers 104 can send and receive test fixture data through a communications network 308 (e.g., Ethernet).

In general, File Synchronizers 130 and 148 can run periodically, for example every 5 minutes, to check for any new data that has arrived. File Synchronizer 130 running in Location 1 will be looking for the data that has arrived in Location 2 at DCS system 108 and file synchronizer 148 will be looking for the data that as arrived in Location 1 at DCS system 106. If any has arrived then the incremental data is copied. Consequently, file synchronizer 130 running in Location 1 will be copying the data from the Location 2 for placement in database 136 and file synchronizer 148 running in Location 2 will be copying the data from Location 1 for placement in database 154.

Figure 5:
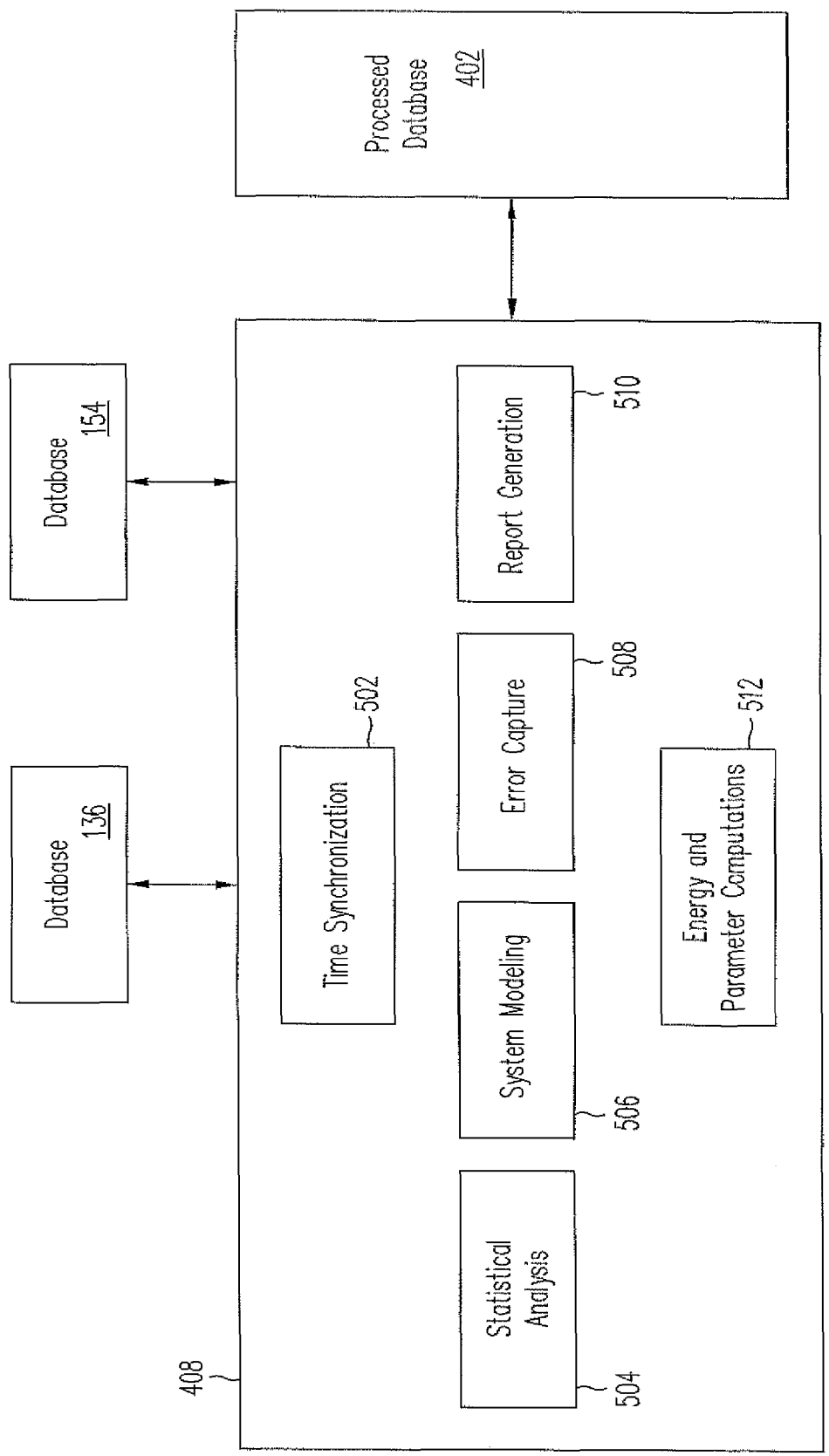
FIG. 5 illustrates processing of the data in the FRP system.

FIG. 5 illustrates an example of data processing 408. As shown in FIG. 5, data processing 408 exchanges data with database 136, database 154, and processed database 402. Data processing 408 includes several modules, including time synchronization 502, statistical analysis 504, system modeling 506, error capture 508, report generation 510, and energy and parameter computations 512.

Individual ones of EPSs 102 on multiple sites are programmed to send their data to a primary one of DCS servers, as shown in FIG. 1, and on failure send to a secondary DCS server at a different geographic location. This leads to splitting of data in the data files into random time sequences. Time synchronization 502 the data, which is asynchronous in time, and writes synchronized data into processed database 402. A MySQL "View" can be deployed to synchronize the stored data. Other analysis programs utilize the synchronized data in this View for further processing. Further, module 402 can reject duplicate data that might appear due to processing same data multiple times. Time synchronization 502 is performed, for example by a MYSQL viewer software, to place data received from individual flow sell systems ESP 100 in sequence by transmission time from the flow cell system instead of time of receipt for FRP system 126.

Statistical analysis module 504 operates to perform statistics on the data. Statistical analysis can be performed on the data set to provide users with statistical information in addition to the monitored incoming raw data. Statistical analysis can include N-Tuple root database analysis. System modeling 506 may also be utilized by the analysis module 504. Report generation module 510 can generate commonly generated reports, for each flow cell system and globally. Data is then communicated with databases 136, 154, and 402 and monitoring systems, for example monitoring application 410, customer portal 412, or system information module 414. Error capture module 508 can monitor the data for errors and report those errors. If the monitoring system receives an error or warning, then a decision for action can be made in ESP controller 404.

Energy and parameter computations 512 can utilize data generated by analysis module 408 to provide individual parameters regarding individual ones of the flow cell systems in ESPs 102. For example, energy and parameter computations 512 can provide data regarding coulomb counting, pump energy, fan energy, RBC energy, stack energy, and BTS energy for individual flow cell systems. This data may be utilized in report generation 510. Therefore, the field response system includes data collection and storage, offline analysis and field reports, online monitoring, and web based data access and visualization of the data collected.

FRP system 126, and especially analysis and data processing, performed in by modules in analysis 408 can be utilized for live remote monitoring of individual ones of field systems ESP 120, monitoring the operation of installed units and provision of real-time feedback to the experts in real time monitoring 410, and prediction of short or long term failure modes in system information 414. Avoidance mitigation of by preemptive measures can be performed utilizing the results of analysis 408.

The online monitoring software in monitoring module 410 may have several features. In addition to the slow offline analysis it is essential to monitor every field system of developing problems and initiate immediate action in real-time. This can be achieved by a Java-based program which is run by the surveillance team 24/7 to monitor system parameters. It facilitates decisions on "who to call" and "what to do" in the event of a problem. Such a program is illustrated in FIG. 6B, for example. Some features of the monitoring program can include that it refreshes data every minute to be most useful; displays raw data in a per-system graphical view; provides graphic/audio feedback promptly; provides feedback via e-mails, SMS; and takes long term trends from offline analysis into account.

In addition to analysis module 408, the FRP system module 400 can provide access to database 402 for offline analysis and field reports through system information 414. Offline analysis can calculate various levels of systems parameters and, using statistical modeling techniques, predict trends of ESP system malfunction. Access to the data can be provided through customer portal 412 or through system information module 414. Based on trends it provides for further useful warning/alarm feedback and publication of calculated data. In some embodiments, offline analysis can publish multiple levels of system data in report format to webpages periodically (for example hourly). These reports can be tailored to serve entirely different groups of recipients. Further, generation and web publication of reports for customers, experts and sales department, include monitoring/analysis of engineering systems on a special footing, can be performed.

ESP controller 404 provides for response when an error is detected, as well as providing commands to specific ones of ESPs 102. Errors may be detected in one of the ESPs 102 by data processing 408. In some embodiments, ESP controller 404 may be performed by an operator in monitoring application 410. In some embodiments, ESP controller 404 can be automatically operated without operator input.

Figure 6A:
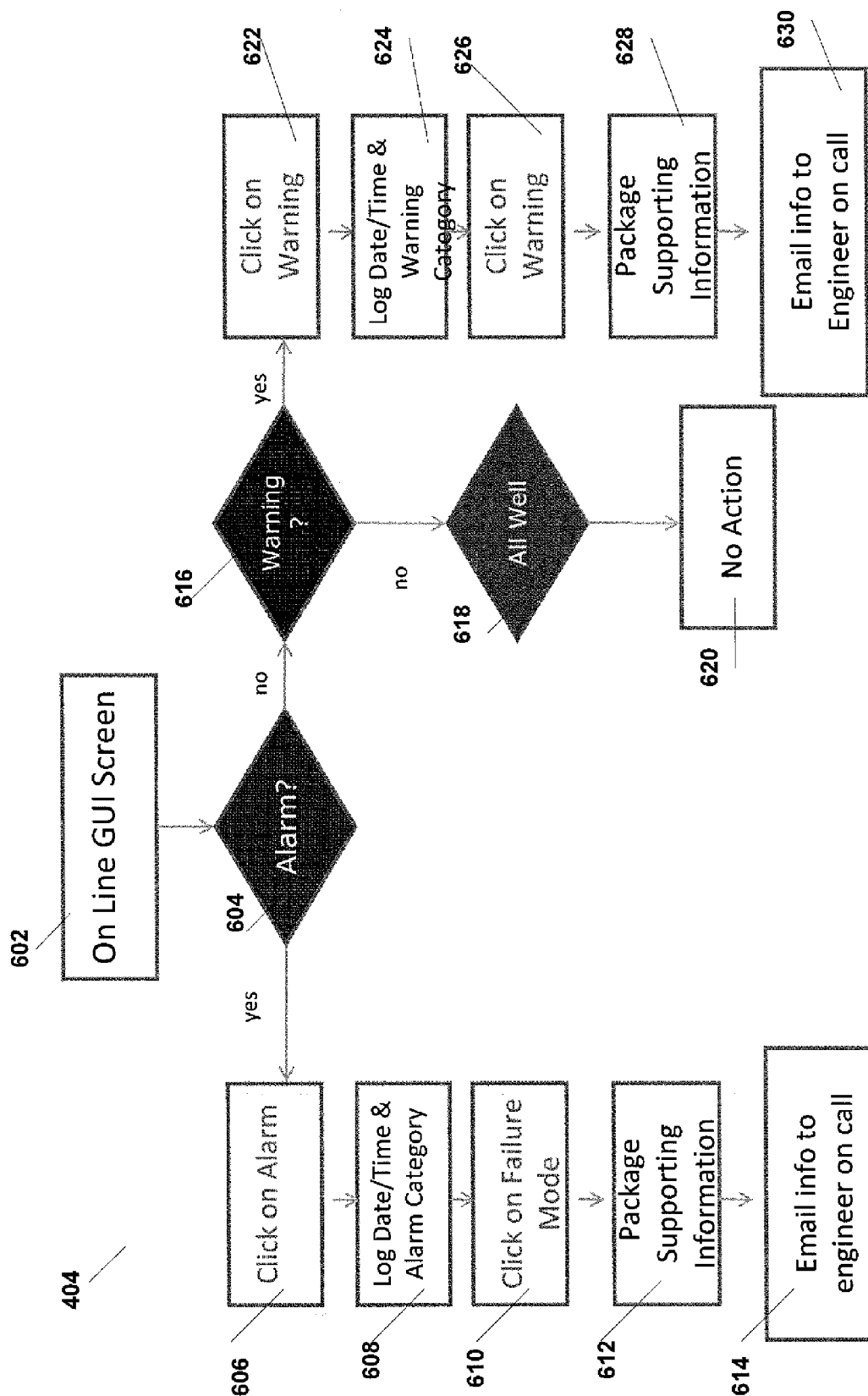
FIGS. 6A and 6B illustrate the examples of error processing as illustrated in FIG. 4.
Figure 6B:
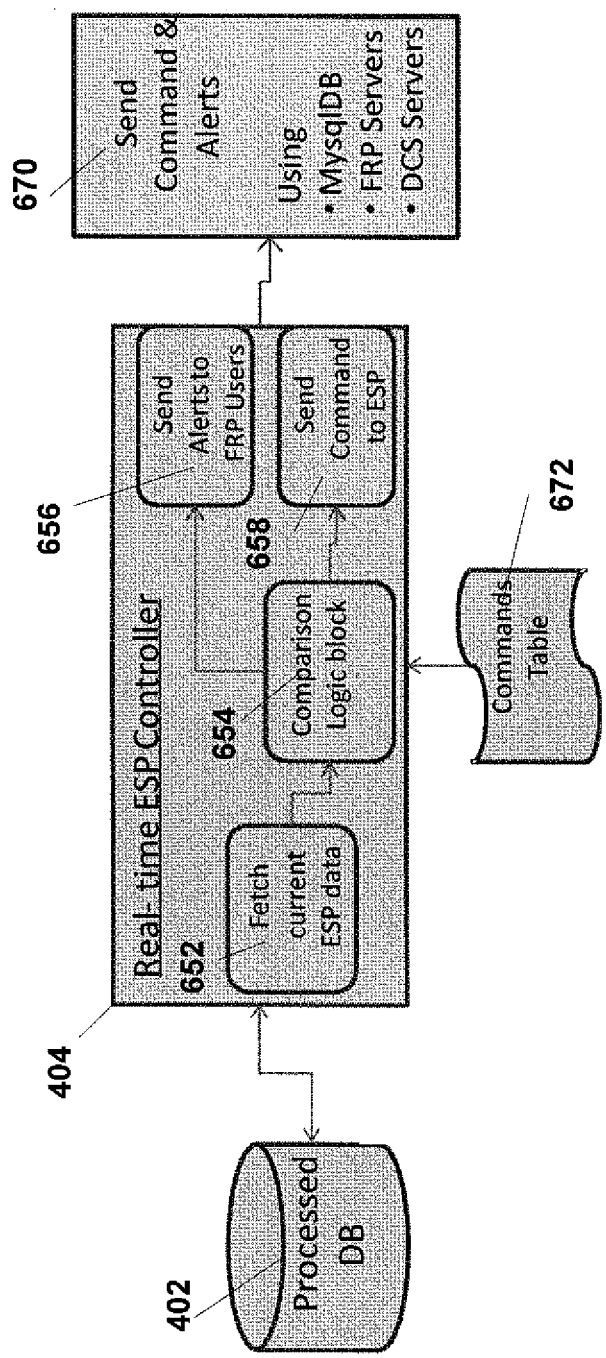

FIG. 6A illustrates a procedure that can be performed by an operator at monitoring application 410. As shown in FIG. 6A, the operator operates an on-line screen 602. When an alarm 604 occurs, then the operator investigates the alarm in step 606, logs the alarm in step 608, investigates the failure mode in step 610, packages the information in step 612, and emails the alarm and information to an engineering professional for handling in step 614. Similarly, if a warning 616 is detected the operator investigates the warning in step 622, logs the warning in step 624, investigates the failure in step 626, packages the information in step 628, and emails the information to an engineer in step 630. Alarm 604 and warning 616 can be generated by analysis 508 or by monitoring application 410. If alarm 604 and warning 616 are not triggered, then in step 620 no action is taken.

FIG. 6B illustrates an embodiment of ESP controller 404. As shown in FIG. 6B, ESP controller 404 communicates data with processed database 402. Module 652 fetches current data on ESPs 102. Module 654 compares the current data with the reference values. If the current value has deviated from the reference values then a command is sent out to the individual ESP. Valid commands and responses can be stored in a command table 672. If a command is detected, module 658 may send a command to an individual one of ESPs 102. Further, module 654 may also send alerts. As shown in module 670, alerts may be sent to any of the servers. Alerts may also be sent to any of the servers of the DCS system 124 or FRP system 126. Alerts are sent to FRP Users using the mysqlDB, FRP servers and DCS servers as shown in module 670.

Additionally, ESP controller 404 can receive any of the reports or analysis that is generated by analysis module 408. In module 654, ESP controller 404 can check for critical conditions and trends in any of the ESPs 102 and in turn send commands to control that individual one of the ESPs 102 automatically. In doing so, module 654 can check the status of individual ESPs 102 and lookup up the appropriate response command for the detected status or trend to send to the ESP. For example, module 654 can check for hydrogen levels in an individual flow cell ESP, which is one of ESPs 102. If the hydrogen level is greater than 100%, then ESP controller 404 can send a system shutdown command to that ESP of the ESPs and initiated a stack maintenance request. In the operation of individual ones of ESPs 102, various limits or conditions can result in commands being automatically generated for that individual ESP. The following table illustrates examples of some of these detected status or trends, conditions, and resulting actions and commands generated by module 654 of ESP controller 404.

| ESP Status/Trend | Limits | Actions/Command for ESP |
|---|---|---|
| System Hydrogen Level | >70% | Reduce Charging SoC limit by 15% |
|  | >90% | Reduce Charging SoC limit by 35% |
|  | >100% | Shutdown System, Start Stack Maintenance activity |
| ESP Discharging and ABB Discharging | ESP SoC >25% and Discharge >5 minutes | Turn off ABB |
| Imbalance of the System is high | Imbalance >15% | Electrolyzer ON |
| Imbalance of the System is Low | Imbalance <5% | Electrolyzer OFF |

Figures 7, 7A:
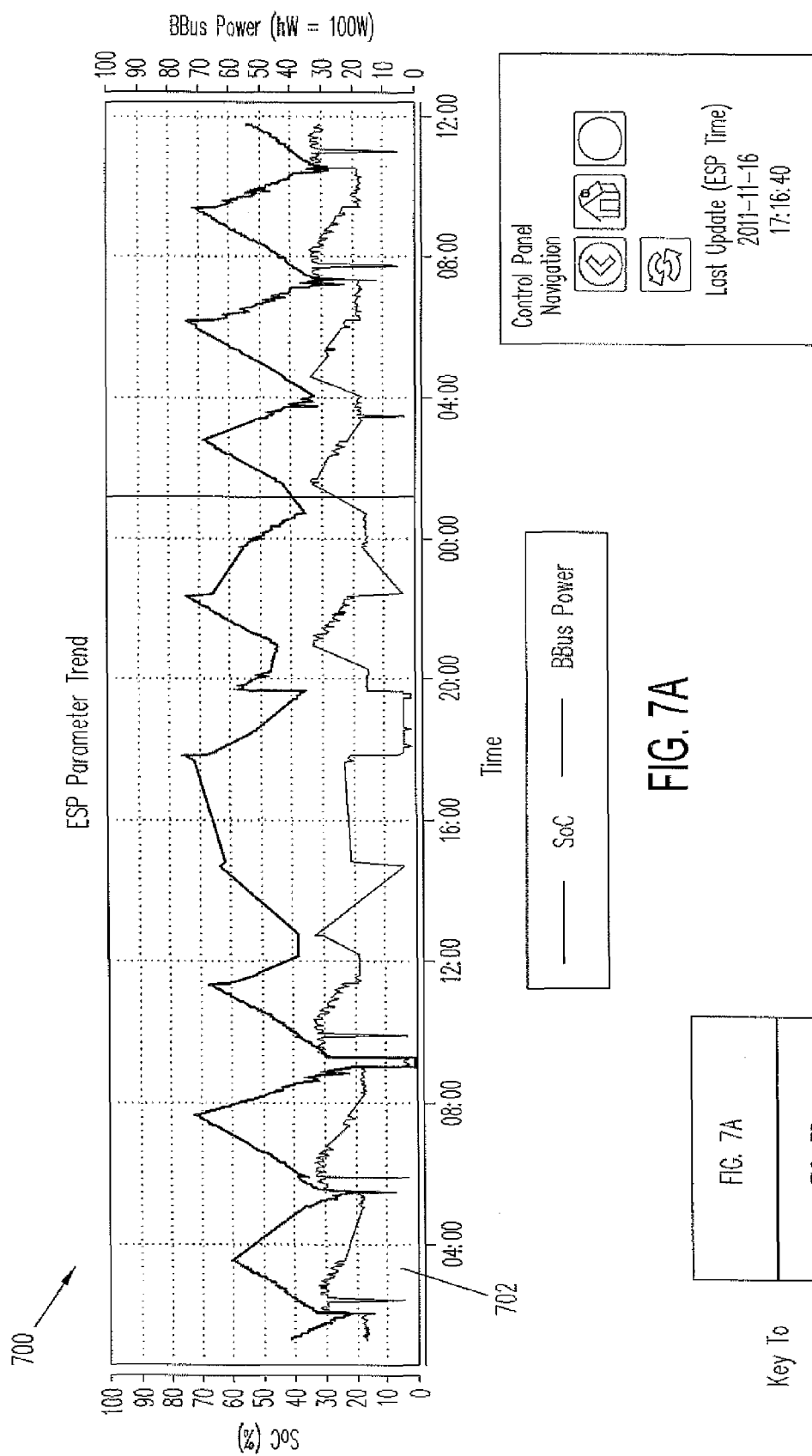
FIG. 7 illustrates an example screen shot monitoring a flow system according to some embodiments of the present invention.
Figure 7B:
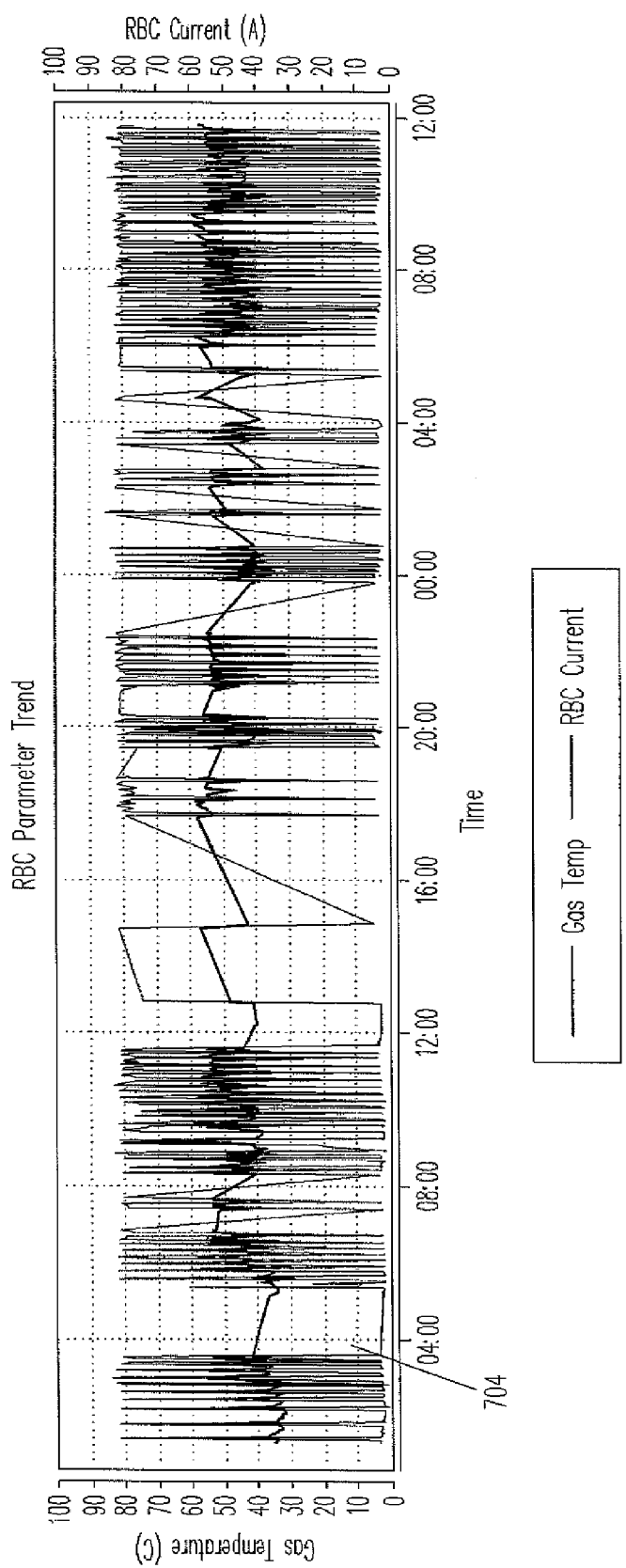

As shown in FIG. 4, FRP system 400 can also provide a web-based tool 410 for data access in customer portal 412 or system information 414. A screen shot from such a web based monitoring system is illustrated in FIG. 7. Such web-based access can provide a convenient tool for engineers trying to diagnose a failure. A CGI-based Web Tool provides data in excel-ready format, accessible on any device equipped with a browser. In some embodiments, customer-specific data may be provided. In addition to providing data, the FRP system 400 lets the user plot historical trend of parameters over time and their correlation on a per-system basis or compare a specific trend or correlation across multiple systems. This tool is especially useful for engineers during a meeting where running a detailed software update is not viable. In some embodiments, this CGI tool is Perl-based and uses many advanced features while sporting a very fast response.

In some embodiments, system information 414 can be utilized as a reliability portal. In the reliability portal, the serial number of the components are stored in the database. Any change to this can be checked and graphed. Change causes are also logged in the System and are transmitted to the Server. Reliability Statistics can be obtained by the run parameters and failure parameters.

Monitoring in monitoring app 410 can be alerted to any commands sent by ESP controller 404 and actions such as those illustrated in FIG. 6A can be performed by an operator. Further, real-time performance of individual ones of ESP 102 can be displayed by monitoring app 410. Such a display is illustrated in screen shot 700 illustrated in FIG. 7. Although any parameter received from the ESPs in ESP 102, screen shot 700 illustrates in trace 702 the state of charge and the output power of one of the ESPs and in trace 704 the gas temperature and rebalance cell current.

Figure 8:
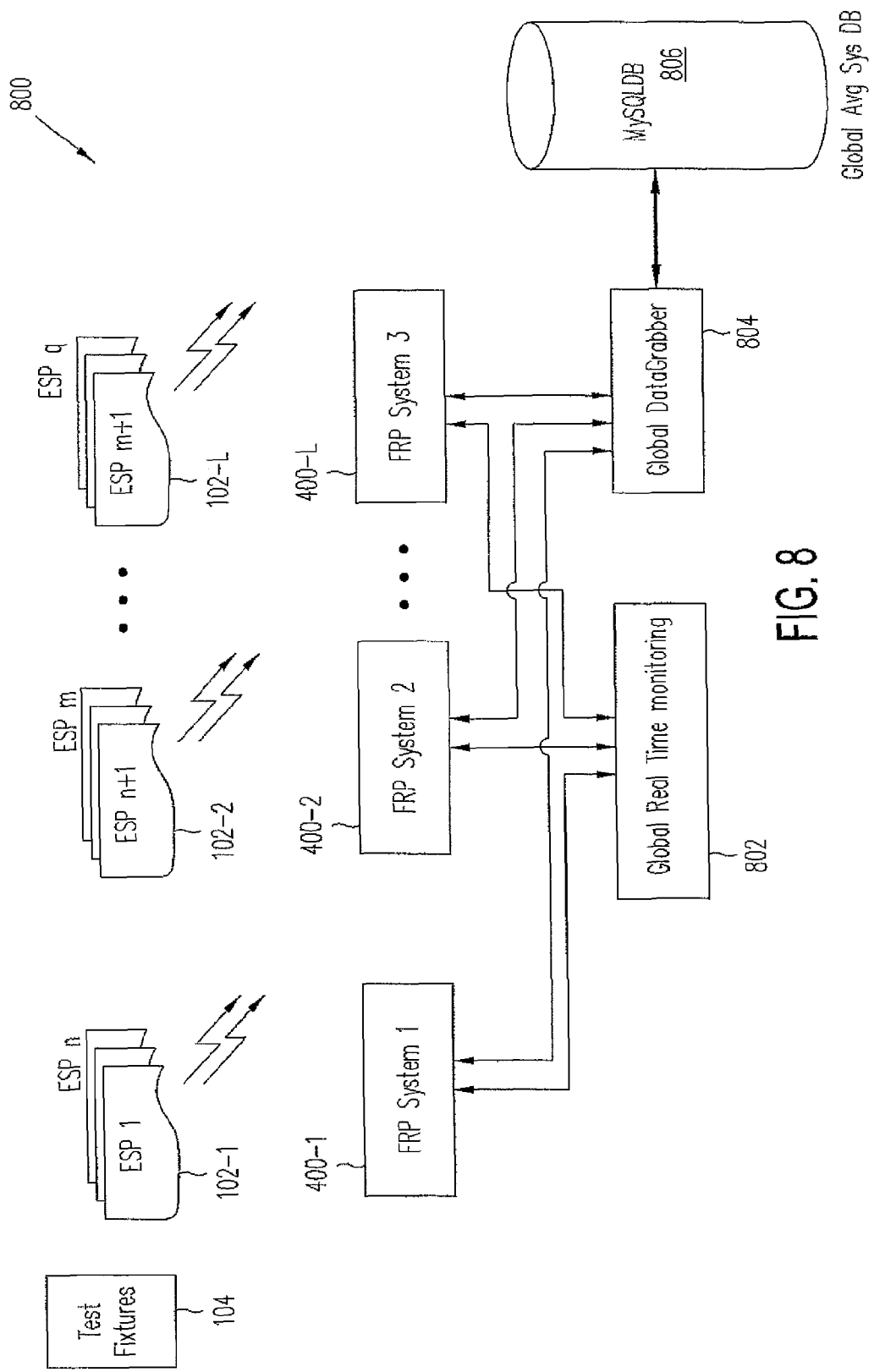
FIG. 8 illustrates an extended field response system that includes several modular field response system illustrated in FIG. 4.

The FRP system is scalable to accommodate any number of ESP systems 102. As shown in FIG. 1, ESPs 102 includes n individual flow cell systems. FIG. 8 illustrates a scalable FRP system 800. As shown in FIG. 8, FRP system 800 can include modular FRP systems 400-1 through 400-L. Each of modular FRP systems 400-1 through 400-L can communicate with a set of ESPs 102. For example, modular FRP system 400-1 can communicate with ESPs 102-1, which includes n individual flow cell systems (ESPs); modular FRP system 400-2 can communicate with ESPs 102-2, which includes flow cell systems (ESPs) n+1 through m. Any number L of FRP systems 400-1 through 400-L can be utilized to communicate with the individual flow cell systems grouped in ESPs 102-1 through 102-L.

As shown in FIG. 8, global real time monitoring 802 can communicate with each of FRP systems 400-1 through 400-L. As shown in FIG. 4, each of monitoring systems 400-1 through 400-L includes a global monitoring portal 416. Global monitoring portal 416 provides data from processed database 402. Further, each of monitoring systems 400-1 through 400-L includes a global data grabber 406 that transfers data from processed database 402 to global data grabber 804. Global data grabber 804 receives all of the data from each of FRP systems 400-1 through 400-L and stores that data into global database 806. Global database 806 can be any database, including a MySQL database. Global real time monitoring 802 receives the latest data from each of FRP systems 400-1 through 400-L for global real-time monitoring of FRP system 800.

Utilizing modular FRP systems 400, FRP system 800 can be scalable to accommodate any number of individual ESP systems and is expandable as the number of ESP systems grows. Further, DCS systems 124 and the corresponding FRP servers can be located at any number of geographic locations. In particular, servers can be located in close proximity of individual ESP installation sites.

As discussed above, embodiments of an FRP system 126 according to the present invention includes many features. As discussed with FRP system 800 illustrated in FIG. 6, utilizing modularity of FRP system 400 illustrated in FIG. 4, FRP system 126 according to some embodiments of the present invention are highly scalable in order to accommodate a growing number of deployed ESP systems. Further, as is illustrated in FIG. 1 with DCS system 124 having multiple locations, FRPS system 126 is distributed to serve various transcontinental geographic locations of the deployed ESP systems.

Further, FRP system 126 is platform independent. While data analysis may be performed on high performance services, the end user data may be analyzed on end user computers (e.g. personal computers). Further, FRP system is redundant and utilizes multiple servers to remain continuously available. Further, FRP system, either in module 138 shown in FIG. 1 or in module 408 shown in FIG. 4, can utilize various statistical modeling algorithms to mine and analyze the data captured from individual ones of the ESPs 102.

Additionally, FRP system 126 can report system status and performance and may raise warnings or alarms to monitors utilizing email or the SMS networks. Further, FRP system 126, as is illustrated in FIG. 1 and in modular system 400 of FIG. 4, can be monitored remotely.

Additionally, FRP system utilizes several databases, including database 136, database 154, processed database 402, and global database 806, all of which can be scalable data storage and backup solutions that help to eliminate data loss. As such, FRP system 126 ensures data integrity and backward compatibility. Further, FRP system 126, as illustrated in FIG. 1 by webtool 142 and in FIG. 4 by customer portal 412 and system information module 414, makes data available on the interact in various forms (including raw data and analyzed reports and graphs). As such, customers can have access to data pertaining to their ESPs and process and analyze that data according to their requirements.

Embodiments of FRP system 126 can be easily maintained and components, for example new modular FRP systems 400, can be quickly deployed, for example at new sites. FRP system 126 can be easily monitored and failure recovery performed quickly and transparently. Finally, as is discussed above with respect to ESP controller 404, commands can be sent to individual ones of the ESPs based on data trends and error conditions detected, for example by analysis module 408.

Embodiments of FRP system 126, and modular FRP system 400, discussed above can have many features. For example, FRP system 126 is a multi-server/multi-datatype system. The data is processed and inserted into database 402 to provide timed updates. All of the data may be completely out of sync. When the data is received, it is put together and synchronized. If there are holes in the time segments, the system will tolerate the missing data and fill in when that missing data arrives. Whatever is received is processed. In other words, the monitoring systems (e.g., analysis 408) will provide data as it arrives in sequence, filling in the sequence with data as it arrives. In addition, the data formats may be different depending on source and data route. FRP system 126 receives the data from several different formats and yet ensures, through the operation of data grabbers 134 and 152, that the data is synchronized and associated with the proper storage system.

One notable feature of some embodiments of FRP system 126 includes, for example use of multi-processor server systems, which can run Ubuntu Linux O/S. It takes as little as a day to install a unit with all the necessary software. With minimal system-specific IP configuration the system joins FRP system 800. Further, a high availability of FRP system 800 High availability of FRP system 800 is achieved through deploying multiple DCS servers located in different geographical locations. Any of these servers can be brought down for maintenance w/o affecting the rest of the system.

A statistical package is integrated into the system. The statistical package provides algorithm libraries for offline data analysis and modeling. Given the observed trends the statistical package is capable of producing ESP simulation data for system debugging/testing purposes. The long term trends obtained by the offline analysis give feedback to the online software for smart decision making in realtime, which the latter can not do on its own. The token-based Object Oriented data parser is very flexible to identify and discard problematic data with minimal data loss. It is also able to identify and process any new tokens arriving in the data stream. The data capture servers send asynchronous data to the central DB. The DB is designed to do synchronization on the fly by employing MySQL "Views". On the basis of observed trends the FRP system 126 online software can send commands to the DCS systems 124 to do certain tasks or to change the system operating parameters.

In some embodiments, each FRP modular system 400 is expected to be efficient to service several (e.g. 100) field systems. Beyond that FRP system 800 can be migrated to a Java-based (JBOSS) Enterprise Solution and modular system 400 utilized. In MOSS, the loosely bound components of some embodiments would be managed under a single framework with many industry-proven features to enhance performance, security and data integrity, in addition to easy maintenance. Features can be provided in sync with the DCS system 124 for improving ESP systems 102 remote monitoring and maintenance. A detailed response algorithm from data trends can be provided.

Further embodiments can be envisioned to one of ordinary skill in the art after reading this disclosure. In other embodiments, combinations or sub-combinations of the above disclosed invention can be advantageously made. The specification and drawings are, accordingly, to be regarded in an illustrative rather than restrictive sense. It will, however, be evident that various modifications and changes may be made thereunto without departing from the broader spirit and scope of the invention as set forth in the claims.

What is claimed is:

1. A field response system, comprising:
a first data grabber receiving first data files from a first communications system server, the first communications system server receiving data for the first data files from a plurality of battery flow cell systems;

a first synchronizer receiving second data files from a second communications system server and coupled to the first data grabber, the second communications server receiving data for the second data files from the plurality of flow cell systems;

a first database, the first database storing first synchronized data combining the first data from the first data grabber and the second data from the first synchronizer, and an analysis module coupled to the first database that receives first synchronized data from the first database, performs a time synchronization of the first synchronized data to form fully synchronized data, and statistically analyzes the fully synchronized data utilizing battery flow cell system modeling.

2. The system of claim 1, further including
a second data grabber receiving second data files from the second communications server;
a second synchronizer receiving first data files from the first communications server and coupled to the second data grabber; and
a second database, the second database storing second synchronized data combining the second data from the second data grabber and the first data from the second, including data from the second synchronizer and the second communications system,
wherein the analysis module receives data from the second database.

3. The system of claim 1, wherein the first data grabber includes
at least one individual data grabber coupled to a corresponding communication system (DCS) server of the first communications system; and
at least one individual data grabber coupled to the first synchronizer,
wherein the corresponding DCS server includes a short message service (SMS) server and a general packet radio service (GRPS) server and
wherein the first synchronizer includes an SMS file synchronizer and a GPRS file synchronizer.

4. The system of claim 2, wherein the second data grabber includes
at least one individual data grabber coupled to a corresponding communication system (DCS) server of the second communications system; and
at least one individual data grabber coupled to the second synchronizer,
wherein the corresponding DCS server includes a short message service (SMS) server and a general packet radio service (GPRS) server and
wherein the second synchronizer includes an SMS file synchronizer and a GPRS file synchronizer.

5. The system of claim 2, further including
a third database;
the analysis module coupled to receive first synchronized data from the first database and second synchronized data from the second database and write processed data into the third database.

6. The system of claim 5, wherein the analysis module
captures errors;
computes parameters related to the plurality of flow cell systems; and
generates reports based on the statistical analysis.

7. The system of claim 6, further including flow-cell controller, the flow-cell controller providing commands to the plurality of flow cell systems.

8. The system of claim 6, further including
providing a real-time monitoring;
providing a customer portal;
providing system information.

9. The system of claim 8, wherein providing a real-time monitoring includes
providing an operator with requested information and reports regarding individual ones of the plurality of flow systems.

10. The system of claim 8, wherein providing a customer portal includes
providing a customer with request information and reports regarding individual ones of the plurality of flow systems associated with the customer.

11. The system of claim 8, wherein providing system information includes
providing request information and reports regarding individual ones of the plurality of flow systems associated with the customers.

12. The system of claim 6, wherein the analysis module provides reliability tracking for individual ones of the plurality of flow systems.

13. The system of claim 5, further including
a global real time monitor coupled to a global monitoring portal coupled to the third database;
a global data grabber coupled to a global data monitor portal coupled to the third database; and
a global database coupled to the global data grabber to store data from the system.

14. The system of claim 13, wherein the global real time monitor and the global data grabber are coupled to a second field response system to store data from the second field response system into the global database.

15. A method of monitoring a plurality of flow cell systems, comprising:
receiving first data files from a first communications system server into a first data grabber, the first communications system server receiving first data from a plurality of flow cell systems;
receiving second data files from a second communications system server into a first synchronizer that is coupled to the first data grabber, the second communications server receiving second data from the plurality of flow cell systems; and
storing first data received from the first data grabber synchronized with second data from the first synchronizer into a first database as first synchronized data; and
analyzing the first synchronized data from the first database by
performing a time synchronization of the first synchronized data to form fully synchronized data, and
statistically analyzing the fully synchronized data utilizing flow cell battery system modeling.

16. The system of claim 15, further including receiving second data files from the second communications server into a second data grabber;
receiving first data files from the first communications server into a second synchronizer that is coupled to the second data grabber;
storing second data from the second data grabber synchronized with first data from the second synchronizer as second synchronized data into a second database; and
analyzing the second synchronized data includes data from the second database.

17. The system of claim 15, wherein receiving first data files from the first communications system server into the first data grabber includes
- receiving data into an individual data grabber corresponding to each communication system (DCS) server of the first communications system; and
- receiving data into the individual data grabber coupled to each file synchronizer of the first synchronizer,
- wherein the DCS servers of the first communication system includes a short message service (SMS) server and a general packet radio service (GPRS) server and
- wherein the file synchronizers of the first synchronizer includes an SMS file synchronizer and a GPRS file synchronizer.

18. The system of claim 17, wherein receiving second data files from the second communications server into a second data grabber includes
- receiving data into an individual data grabber corresponding to each DCS server of the second communications system; and
- receiving data into the individual data grabber coupled to each file synchronizer of the second synchronizer,
- wherein the DCS servers of the second communication system includes an SMS server and a GPRS server, and
- wherein the file synchronizers of the second synchronizer includes an SMS file synchronizer and a GPRS file synchronizer.

19. The system of claim 16, wherein
- analyzing the second synchronized data generates processed data, and further including
- writing the processed data into the third database.

20. The system of claim 19, wherein analyzing the second synchronized data further includes
- capturing errors;
- computing parameters related to the plurality of flow cell systems; and
- generating reports based on the statistical analysis.

21. The system of claim 20, further including providing commands to the plurality of flow cell systems based on the processed data.

22. The system of claim 19, further including
- providing a real-time monitoring;
- providing a customer portal; and
- providing system information.

23. The system of claim 19, further including
- sending processed data from the third database to a global data grabber for storage in a global database.

24. The system of claim 23, further including the global data grabber receiving data from a second field response system to store data from the second field response system into the global database.

* * * * *